(No Model.)
M. HALL.
WELL FISHING TOOL.
No. 477,178. Patented June 14, 1892.
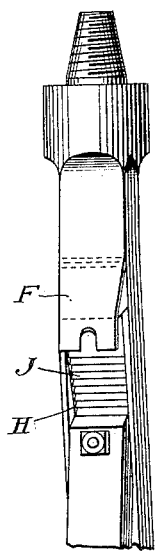
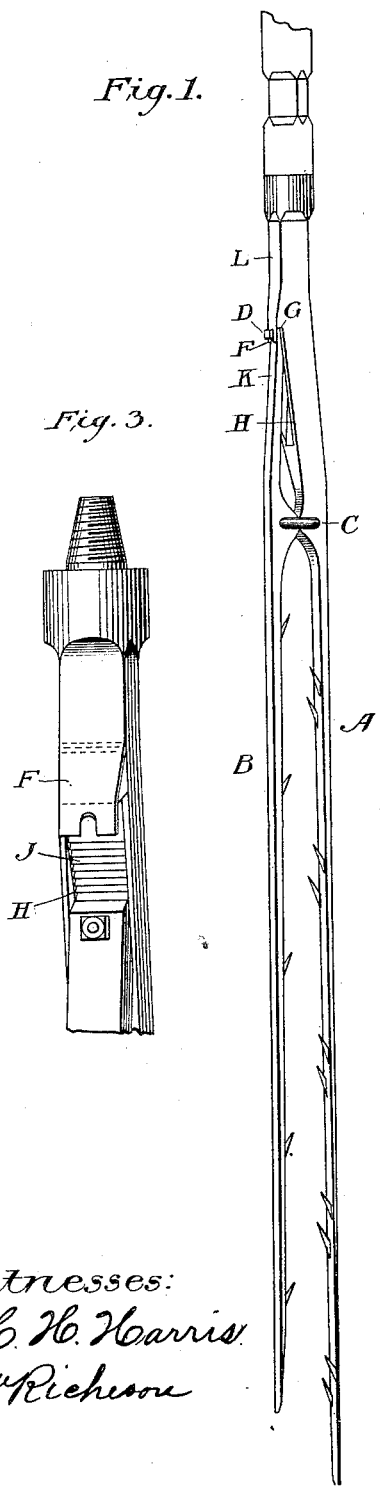
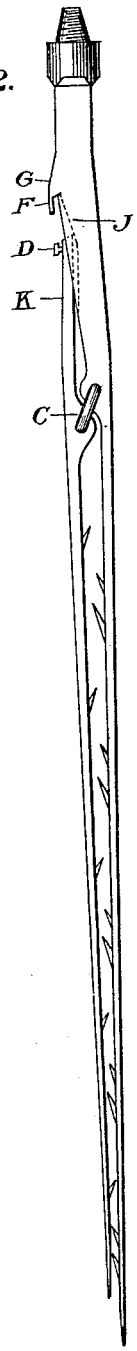
Witnesses:
C. H. Harris
Wm Richeson
Inventor:
Major Hall

UNITED STATES PATENT OFFICE.

MAJOR HALL, OF ST. PAUL, MINNESOTA, ASSIGNOR OF ONE-HALF TO JACOB WEBBER THOMPSON, OF SAME PLACE.

WELL-FISHING TOOL.

SPECIFICATION forming part of Letters Patent No. 477,178, dated June 14, 1892.

Application filed December 24, 1891. Serial No. 416,099. (No model.)

*To all whom it may concern:*

Be it known that I, MAJOR HALL, of St. Paul, Ramsey county, Minnesota, have invented certain Improvements in Well-Fishing Tools, of which the following is a specification.

My invention relates to improvements in that class of well-fishing tools which are designed to grapple the detached portion of a broken rope attached to drilling-tools in the well, my object being to provide a device which may be forced downward in the tube and automatically grapple and lock itself upon the rope, so as to permit of its being worked up and down in the tube without becoming disengaged from the rope.

To this end my invention consists in providing a pair of slender clamping-jaws loosely linked together, one being relatively fixed or integral with the head or handle of the clamp, while the other is relatively movable upon it. These jaws are convex on their outer surfaces, so as to fit to the concave inner surface of the tube, and their inner or adjacent surfaces are provided with barbs or prongs extending upward. The relatively-fixed member is provided with a shoulder or stop against which the end of the movable member abuts when raised, so that the connecting-link stands at right angles with the members, thereby holding them spread to their limit, while a rack with inclined teeth upon the fixed member is engaged by the loose member as a pawl when slipped downward, so as to lock the members upon an object and prevent the detaching of the clamp therefrom.

My invention further consists in the specific construction and combination hereinafter described, and particularly pointed out in the claims.

In the accompanying drawings, forming part of this specification, Figure 1 is an elevation of my improved device shown with the jaws or members locked open. Fig. 2 is a similar view shown with the jaws locked in closed position, and Fig. 3 is a detail of the locking devices.

In the drawings, A and B represent the jaws or members of the clamp, made, preferably, of steel to secure strength and elasticity, provided with series of upturned barbs or prongs, and connected together by means of the link C. The member A is rigidly connected to or formed integral with the handle or head L, which is adapted to be connected to the source of power. The member A or the head L is provided with a stop G, having an overhanging slotted lip or projection F. The upper end of the member B has a reduced shank K, adapted to fit under the lip F and abut against the stop G, and is held in that position by means of a set-screw D, entering the slot F and adapted to be screwed down upon the lip, so as to firmly grip the parts together. The member A is provided with a groove H, adjacent to the shank K, in which the shank works and which guides the screw D into the slot of the lip F. In the bottom of the groove H there is arranged a ratchet or inclined toothed rack J, with which the reduced end of the shank engages as a pawl when the member B slips downward along the member A, thus holding the member B from reverse movement.

The operation of the device is as follows: The member B being lifted upward so that its shank K fits against the stop G, with the set-screw D entering the slot of the lip F, the set-screw is turned so as to firmly hold the shank in place. In this position the link C stands at right angles with the jaws, as shown in Fig. 1. With the parts in this position the device can be lowered into the well, the members bearing against the inner walls of the tube as lowered and the points passing between the rope and the tube, so that a number of the barbs or prongs are brought into engagement with the rope. Upon lifting the device the strain of the rope upon the prongs of the member B will disengage the shank from the head L. The member B then drops downward, hanging by the link, which carries it toward the member A, thus closing upon the rope. (See Fig. 2.) The shank bearing upon the upper part of the member A acts as a lever to hold them together the more firmly. At the same time the shank, acting as a pawl, engages the rack J, thus locking the members upon each other and preventing the reverse movement of the movable member. In this position the device may be raised and lowered without being disengaged from the rope until finally the attached tools are loosened and lifted out.

I claim—

1. In a device of the class described, the combination, with the relatively-fixed jaw and the movable jaw linked thereto, of the barbs upon the adjacent faces of the jaws and means for automatically locking the jaws upon each other when in clutched position, substantially as described.

2. In a device of the class described, the combination of the members loosely linked together and adapted to fit within a pipe or cylindrical hole, the barbs upon the inner faces of the members, means for setting the members in open position, and means for automatically locking the members when clutched, substantially as described.

3. In a device of the class described, the combination of the members having convex exterior faces adapted to fit into a cylindrical pipe, the barbs upon their adjacent or meeting faces, the link loosely connecting them to each other, the device for setting them in open position, and the automatic locking device for holding them in clutched position, substantially as described.

4. The combination of the fixed clamp member, the movable clamp member linked thereto, the barbs upon their adjacent faces, the stop device upon the fixed member for limiting the upward movement of the movable member thereon, means for setting them in open position, and means for automatically interlocking them in clutched position, substantially as described.

5. The combination of the fixed member, the movable member linked thereto, the barbs upon the inner faces of said members, and the rack upon the fixed member adapted to be engaged by the end of the movable member, so as to lock them together in clutched position, substantially as described.

6. In a device of the class described, the combination, with the relatively fixed and movable clamp members provided with barbs upon their inner faces, of the link loosely connecting said members together, the grooved guide upon the fixed member to receive the upper end of the movable member and to hold it substantially parallel with the fixed member, the stop upon the fixed member provided with an overhanging slotted projection or lip, and the set-screw upon the movable member adapted to enter said slot and to be screwed down upon said lip, so as to set the clamp in open position, substantially as described.

7. In a device of the class described, the combination of the relatively-fixed clamp member, the relatively-movable member, the link connecting said members together, the barbs upon the inner faces of said members, the slotted stop upon the fixed member, the shank upon the movable member adapted to abut against said stop, and the set-screw upon said shank adapted to enter said slot and be screwed down upon said stop, so as to set the clamps in open position, substantially as described.

8. In a device of the class described, the combination of the relatively-fixed member, the relatively-movable member linked thereto, the barbs upon the inner faces of said members, the guide upon the fixed member, the shank upon the movable member working therein, and the rack upon the fixed member adapted to be engaged by said shank, so as to automatically lock said members together in clutched position, substantially as described.

9. A clamp comprising, in combination, a relatively-fixed jaw, a relatively-movable jaw linked thereto, and means for automatically interlocking them in clutched position, substantially as described.

10. A clamp comprising, in combination, a relatively-fixed jaw, a relatively-movable jaw linked thereto, barbs arranged upon the inner faces of said jaws, the guide upon one engaged by the other jaw and holding them parallel with each other, substantially as described.

11. A well-fishing tool consisting of a pair of similar slender-pointed jaws having convex outer faces and barbed inner faces, means for setting them in open parallel position, and automatic means for locking them in clutched position, substantially as described.

12. A clamp comprising, in combination, a relatively-fixed jaw, a relatively-movable jaw linked thereto, and means for automatically locking the jaws together in any relative position when clutched upon an object.

13. A clamp comprising, in combination, a relatively-fixed jaw, a relatively-movable jaw linked thereto, devices upon the inner faces of the jaws for engaging an object, and means for automatically locking the jaws in clutched position.

MAJOR HALL.

Witnesses:
WM. RICHESON,
PETER JOHNSON.